(12) United States Patent
Howick et al.

(10) Patent No.: US 7,141,760 B2
(45) Date of Patent: *Nov. 28, 2006

(54) COVERED CONDUCTOR AND HEATER FORMED THEREWITH

(75) Inventors: Shaun Calvin Howick, Tecumseh (CA); Goran Bajic, Windsor (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/127,562

(22) Filed: May 12, 2005

(65) Prior Publication Data

US 2005/0199611 A1 Sep. 15, 2005

Related U.S. Application Data

(63) Continuation of application No. 10/295,491, filed on Nov. 15, 2002.

(51) Int. Cl.
    *H05B 1/00* (2006.01)
(52) U.S. Cl. .................. 219/211; 219/549
(58) Field of Classification Search ......... 219/211, 219/212, 217, 528, 544, 545, 549, 553; 29/611
    See application file for complete search history.

(56) References Cited

U.S. PATENT DOCUMENTS

| | | | |
|---|---|---|---|
| 3,904,847 A | 9/1975 | Adams | |
| 4,272,673 A | 6/1981 | Semanaz et al. | 219/544 |
| 4,308,417 A | 12/1981 | Martin | 174/35 GC |
| 4,429,215 A | 1/1984 | Sakai et al. | 219/528 |
| 4,455,481 A * | 6/1984 | Van Hoof et al. | 219/522 |
| 4,547,658 A | 10/1985 | Crowley | |
| 4,590,359 A | 5/1986 | Mobius | 219/217 |
| 4,628,188 A | 12/1986 | Andreasson | 219/528 |
| 4,695,703 A | 9/1987 | Williams et al. | |
| 4,697,064 A | 9/1987 | Altmann et al. | 219/217 |
| 4,825,048 A | 4/1989 | Altmann et al. | 219/528 |
| 4,845,343 A | 7/1989 | Aune et al. | |
| 4,910,391 A | 3/1990 | Rowe | |
| 4,964,674 A | 10/1990 | Altmann et al. | 297/180 |
| 5,053,595 A | 10/1991 | Derbyshire | |
| 5,081,341 A | 1/1992 | Rowe | |
| 5,111,025 A | 5/1992 | Barma et al. | 219/217 |
| 5,192,834 A | 3/1993 | Yamanishi et al. | |
| 5,336,851 A | 8/1994 | Sawada et al. | |
| 5,521,358 A | 5/1996 | Eilentropp | |
| 5,558,794 A | 9/1996 | Jansens | 219/549 |

(Continued)

FOREIGN PATENT DOCUMENTS

DE 019928152 11/2000

(Continued)

OTHER PUBLICATIONS

International Search Report dated Apr. 6, 2004 for International Application No. PCT/EP03/12833 (2 pages total).

(Continued)

*Primary Examiner*—Tu Hoang
(74) *Attorney, Agent, or Firm*—Dobrusin & Thennisch PC

(57) ABSTRACT

There is disclosed a conductor having a conductive element and a covering surrounding at least a portion of the conductive element. Preferably, the covering has an inner portion and an outer portion formed of different materials such that the melting point of the inner portion is higher than the melting point of the outer portion. The conductor is particularly useful for forming heaters, which may be integrated into a seat of an automotive vehicle.

11 Claims, 2 Drawing Sheets

U.S. PATENT DOCUMENTS

| | | |
|---|---|---|
| 5,654,095 A | 8/1997 | Yin et al. |
| 5,917,155 A | 6/1999 | Hake et al. |
| 6,004,418 A | 12/1999 | Ginman et al. |
| 6,056,995 A | 5/2000 | Hake et al. |
| 6,079,485 A | 6/2000 | Esaki et al. ............... 165/43 |
| 6,147,332 A | 11/2000 | Holmberg et al. |
| 6,252,198 B1 | 6/2001 | Malkin |
| 6,294,770 B1 | 9/2001 | Hasegawa et al. |
| 6,310,332 B1 | 10/2001 | Gerrard |
| 6,318,102 B1 | 11/2001 | Asou et al. ............... 62/244 |
| 6,329,055 B1 | 12/2001 | Higashiura et al. |
| 6,452,138 B1 | 9/2002 | Kochman et al. ......... 219/549 |
| 6,489,595 B1 | 12/2002 | Check et al. ............. 219/217 |
| 6,531,687 B1 | 3/2003 | Michelmann ............. 219/529 |
| 6,555,787 B1 | 4/2003 | Horn et al. |
| 6,792,671 B1 * | 9/2004 | Oberg ...................... 219/217 |
| 2002/0117495 A1 | 8/2002 | Kochman et al. |
| 2003/0111454 A1 | 6/2003 | Ishiyama |

FOREIGN PATENT DOCUMENTS

| | | |
|---|---|---|
| JP | 57-134655 | 8/1982 |
| JP | 01-135693 | 9/1989 |
| JP | 02-129886 | 5/1990 |
| JP | 06-068964 | 3/1994 |
| JP | 06-119967 | 4/1994 |
| JP | A07-031563 | 2/1995 |
| JP | A08-131294 | 5/1996 |
| JP | 2002324656 A2 | 11/2002 |
| WO | WO 09409684 | 11/1994 |
| WO | WO 01 19220 A | 11/2002 |

OTHER PUBLICATIONS

Photographs attached as Exhibit A with attending description.

* cited by examiner

COVERED CONDUCTOR AND HEATER FORMED THEREWITH

CLAIM OF PRIORITY

This application is a continuation of copending application Ser. No. 10/295,491, filed on Nov. 15, 2002 titled COVERED CONDUCTOR AND HEATER FORMED THEREWITH.

FIELD OF THE INVENTION

The present invention relates generally to covered (e.g., coated) conductors and more particularly to covered conductors for use in heating systems of automotive vehicle seats or other articles of manufacture.

BACKGROUND OF THE INVENTION

For many years, industry has been concerned with designing improved conductors for various articles and applications. As an example, industry has designed conductors suitable for integration into heaters, which may be employed in seats of automotive vehicles for providing heat to passengers within those vehicles. In the interest of continuing such innovation, the present invention provides a conductor, which may be suitable for various applications, but which has found particular utility in heaters that may be integrated within seats of automotive vehicles.

SUMMARY OF THE INVENTION

According to one aspect of the invention, there is disclosed a conductor and a method of forming the same. The conductor is formed by providing a conductive element and applying a coating to the conductive element. Typically, the coating includes at least a portion that has a relatively low melting point. According to one preferred embodiment, the conductor has an inner portion with a first melting point and an outer portion with a second melting point that is relatively low compared to the first melting point.

According to another aspect of the invention there is provided a heater and a method of forming the same. The heater is formed by providing a conductor as described above and contacting that conductor with a substrate. During such contact, the relatively low melting point portion of the coating of the conductor is softened by heating and integrated with the substrate. Thereafter, the relatively low melting point portion of the coating is hardened by cooling thereby attaching the conductor to the substrate.

According to still another aspect of the invention there is provided a seat for an automotive vehicle and a method of forming the same. The seat is formed by providing a heater as just described and integrating that heater into the seat.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing an improved coated conductor. It is contemplated that the conductor may be employed in a variety of articles of manufacture including, without limitation, electronic articles such as door panels, wheels, floormats, radios, televisions, calculators, computers or the like. The conductor, however, is particularly suitable for use in heaters and even more particularly, the conductor is suitable for use in heater systems of seats for use in automotive vehicles.

According to one aspect, the conductor of the present invention is provided with a covering (e.g., a coating) wherein at least a portion of the covering is activatable (e.g., has a relatively low melting point). Advantageously, it is possible, although not necessarily required, that the portion of the covering that is activatable (e.g., has the relatively low melting point) may be activated (e.g., heated and softened) such that the softened portion can integrate itself with a substrate for attaching the conductor to the substrate. Upon cooling it will preferably re-harden and attach to the substrate.

Figure 1:
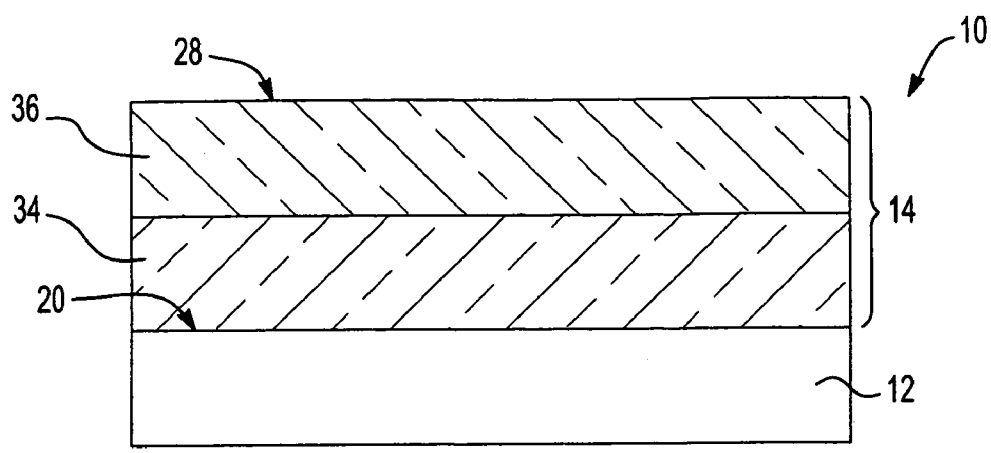
FIG. 1 is a sectional view of a conductor in accordance with one exemplary aspect of the present invention.

Referring to FIG. 1, there is illustrated a schematic diagram of a conductor 10 in accordance with one aspect of the present invention. The conductor 10 includes a conductive element 12 and a covering 14 (e.g., a coating) disposed over at least a portion of the conductive element 12. As shown, the covering 14 is in direct contact with a surface 20 of the conductive element 12, however, it is contemplated that one or more intermediate layers may be disposed between the covering 14 and the conductive element 12, over some or all of the conductive element.

As used herein, the term conductive element 12 is used to refer to any medium capable of carrying an electrical charge, conducting heat or electricity or a combination thereof. Accordingly, the conductive element 12 may be provided in several different shapes, sizes, configurations or the like. As examples, the conductive element 12 may be provided as one or a plurality of plates, blocks, strands, tapes, sheets, weavings, deposited traces (e.g., electrochemically deposited traces, vapor deposited traces) of combinations thereof. The shape of the element may be straight, arcuate, planar, helical, woven, twisted, wound, contoured, geometric, combinations thereof or the like. Furthermore, it is contemplated that the conductive element 12 may be formed as a single component (e.g., as a single wire) or as multiple components (e.g., as a plurality of wires wound or twisted together, axially aligned, or otherwise integrated with each other). It is also contemplated that the conductive element may include a plurality of generally parallel spaced apart wires such as for ribbon cables or the like.

The conductive element may also be formed of a variety of materials. Such materials may include metals, plastics, polymeric materials, elastomers, glass and optical materials, organic materials, inorganic materials combinations thereof or the like. Exemplary metals, which may partially or fully compose the conductive element include, without limitation, copper, aluminum, silver, tin, tungsten, gold, platinum or the like. Exemplary polymeric materials, which may partially or fully compose the conductive element include conductive polymers such as polyaniline, conjugated polymers, doped polymers, combinations thereof or the like. In one embodiment, the conductive element may be provided as a polymeric material having a dispersion of metal or carbon black.

The covering 14, like the conductive element 12, may be formed in a variety of different shapes, sizes and configurations. Thus, the covering may be planar, contoured, continuous, discontinuous (e.g. intermittent, porous, or the like) or combinations thereof. Preferably, the covering 14 forms a layer upon the conductive element 12 wherein the layer has a substantially uniform thickness, however, a variable thickness is also contemplated within the scope of the present invention.

It is also contemplated that the coating is so formed relative to the conductive element that some of the material is disposed in the interstices of separate filaments of the conductive element.

According to one embodiment, the covering 14 may be formed of a singular homogeneous material. For such an embodiment, the melting temperature of the homogeneous material is typically between about 40° C. or lower and about 275° C. or higher, more preferably it is between about 90° C. and about 180° C., even more preferably it is between about 110° C. and about 160° C.

While one embodiment contemplates a homogeneous composition of the coating material throughout the covered conductor, generally, it is preferable for the covering 14 to very in composition at locations across a section or along the covered conductors length. As an example, the composition of the covering 14 will exhibit a gradient across a portion of the covering 14 (e.g., from the conductive element 12 to an outer surface 28 of the covering 14). This can be achieved by introducing a gradient within a single coating layer. It may be achieved by employing a plurality of layers, each an individual substantially homogeneous layer, or having one or more non-homogeneous layers.

By way of example, referring to FIG. 1, one preferred covering 14 is formed of a first portion 34 and a second portion 36 with both portions being formed of compositionally different materials. Preferably, the materials are selected of the first portion 34 does not substantially intermix with the material of a second portion 36. As a result, each of the portions 34 and 36 are able to remain substantially discrete from each other. Of course it is contemplated that some or substantial intermixing or interdiffusion of the materials may occur in certain situations, particularly at the interface 38 of portions 34, 36.

While no particular thickness are required for the portions 34, 36 of the covering, it is contemplated that, particularly for application within heaters, the portions 34, 36 be relatively thin. As examples, the thickness of the inner portion 34 or the thickness of singular homogeneous covering is preferably between about 0.001 inches or lower and about 0.1 inches or higher, more preferably between about 0.005 inches and about 0.05 inches and even more preferably between about 0.0075 inches and about 0.025 inches. Exemplary thicknesses for the outer portion 36 are preferably between about 0.0001 inches or lower and about 0.03 inches or higher, more preferably between about 0.001 inches and about 0.01 inches and even more preferably between about 0.0025 inches and about 0.0075 inches.

In a preferred embodiment, the compositions of the first portion 34 and the second portion 36 are such that the material of the inner portion 34 has a higher melting point than the material of the outer portion 36. For example, the melting point of the inner portion 34 is preferably between about 10° C. and about 200° C., more preferably between about 30° C. and about 150° C. and even more preferably between about 40° C. and about 120° C. greater than the melting point of the outer portion 36.

The actual melting point of the inner portion 34 is preferably between about 80° C. or lower and about 400° C. or higher, more preferably between about 110° C. and about 330° C., even more preferably between about 170° C. and about 275° C. The actual melting point of the outer portion 36 is preferably between about 40° C. or lower and about 275° C. or higher, more preferably between about 90° C. and about 180° C., even more preferably between about 110° C. and about 160° C.

The covering 14 is preferably formed of one or more polymeric materials, which may include plastics, thermoplastics, elastomers, combinations thereof or the like. Exemplary materials include, without limitation, silicon, polytetrafluoroethylene (PTFE), polyvinylchloride (PVC), polypropylene, high density polyethylene (HDPE), low density polyethylene (LDPE), fluorinated or chlorinated polyethylene, fluoroethylene propylene, polyfluoroethylen (PFE), combinations thereof or the like. It is contemplated that the materials mentioned or combinations thereof may be used as the material for a singular material homogeneous covering or a non-homogeneous covering (e.g., a covering having two or more substantially separate portions).

Figure 2:
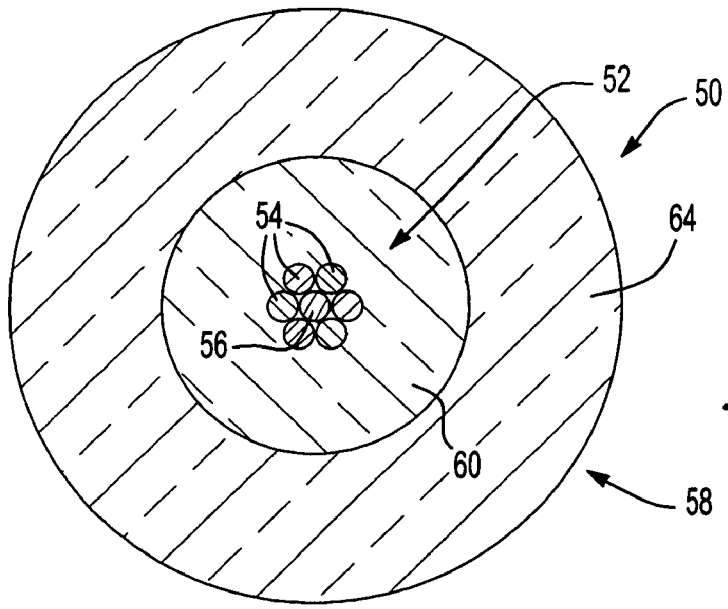
FIG. 2 is a sectional view of another exemplary conductor in accordance with the present invention.

Referring to FIG. 2, there is illustrated one exemplary conductor 50 formed in accordance with an aspect of the present invention. In FIG. 2, the conductor 50 is a wire that is illustrated in cross-section. The conductor 50 includes a conductive element 52 that is comprised of a plurality (e.g., six) of metal strands 54 assembled together. Optionally the strands may be assemble about an insert 56, which is formed of KEVLAR® or another material. The conductive element 52 is substantially entirely surrounded by a covering 58. In the embodiment depicted, the covering 58 includes an inner portion 60, which is generally annular and substantially entirely surrounds the conductive element 52. The covering 58 further includes an outer portion 64 substantially entirely surrounding the inner portion 60 and the conductive element 52. In the embodiment illustrated, the inner portion 60 directly contacts the conductive element 52 and the outer portion 64 directly contacts the inner portion 60 although such is not necessarily required.

In the exemplary embodiment, the inner portion 60 of the covering 58 is formed of fluoroethylene propylene and is about 0.005 inches thick and has a melting temperature between about 185° C. and about 215° C. The outer portion 64 of the covering 58 is formed of polyethylene and is about 0.010 inches thick and has a melting temperature between about 90° C. and about 115° C. The strands 54 of the conductive element 52 are thirty eight gage and are formed of a tin/copper material with a resistance of about 0.32 ohms. Moreover, the final outside diameter of the conductive element 52 is about 0.0365 inches.

Figure 2A:
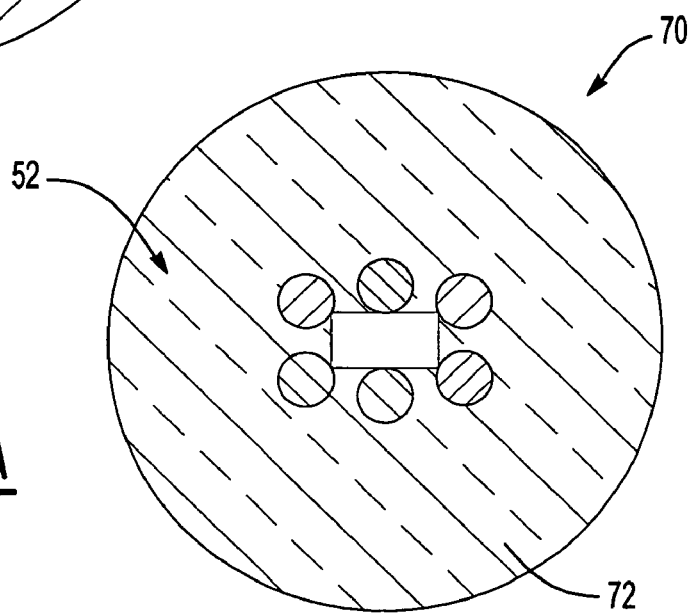
FIG. 2A is a sectional view of another alternative exemplary conductor in accordance with the present invention.

Referring to FIG. 2(a), there is illustrated another exemplary embodiment of a conductor 70 in accordance with the present invention. As shown the conductor 70 of FIG. 2(a) includes the same conductive element 52 as the conductor 50 of FIG. 2. However, the conductor 70 includes a covering 72 formed of a singular homogeneous material. In particular, the entire covering 72 is formed of the polyethylene material that is used to form the outer portion 64 of the conductor 50 of FIG. 2(a).

Manufacture of the conductor of the present invention typically includes application of the covering to the conductive element. The skilled artisan will recognize that many techniques may be employed for applying the covering to the conductive element. For instance, the covering may be brushed, dabbed, painted, poured, pressed, extruded or otherwise placed upon the conductive element to partially or substantially fully cover or coat the conductive element. Alternatively, it is contemplated that the conductive element may be submerged in a bath of substantially molten covering material. Moreover, for conductors with covering having multiple portions of different materials, it is contemplated that the covering may be applied in stages (e.g., application of one material to form a first portion followed by application of a second different material to form a second portion).

For forming the embodiment of FIG. 2, the conductive element 52 may be passed through an extruder such that the extruder coats the conductive element 52 with molten material of the inner portion 60 followed by allowing the molten material to cool, cure, harden or a combination thereof for forming the inner portion 60. Thereafter, the conductive element 52 and the inner portion 60 may be passed together through either the original extruder or another extruder such that one of these extruders coats the inner portion 60 with molten material of the outer portion 64 followed by allowing the molten material to cool, cure, harden or a combination thereof for forming the second portion 64.

As previously discussed, it is contemplated that the conductor of the present invention may be employed in a variety of articles of manufacture and may operate in a variety of capacities. The conductor of the present invention, however, has found particular utility for use in heaters. According to one embodiment, the conductor is attached to a substrate for forming a heater or at least a portion thereof.

The conductor may be attached to a wide variety of substrates for forming a heater and the type of substrate will often depend upon the type of heater desired. Exemplary substrates include fabrics, panels, members, combinations thereof or the like. Moreover, various materials may be employed for forming the substrate. For example, the substrate may be formed of fibrous materials, polymeric materials, metals, combinations thereof or the like. In preferred embodiments, the substrate is formed of a fleece material, a gauze material, a felt material or combinations thereof.

For attaching the conductor to the substrate, various attachments may be employed such as adhesives, fasteners, combinations thereof or the like. It is also contemplated that the conductor may be interferingly attached to the substrate such as by interweaving the conductor with the substrate. As yet another alternative, a portion of the covering of the conductor may activate (e.g., soften or melt) and adhere itself to or integrate itself with the substrate. For example, the temperature of the covering of the conductor may be elevated by heating the covering such that one or more portions (e.g., the portions having lower melting points) are softened for allowing the covering to integrate itself with the substrate followed by lowering the temperature of the covering such that the covering hardens and attaches itself and the conductor to the substrate.

As an example, it is contemplated that a heated member (e.g., a heated plate) may be contacted with the substrate of the heater while the substrate is contacted with the conductor. In turn the heated member conveys energy to the substrate, which conveys energy to the covering thereby softening the covering. In this manner, the softened covering is integrated with the substrate followed by lowering the temperature of the covering such that the covering hardens and attaches itself and the conductor to the substrate.

Figure 3:
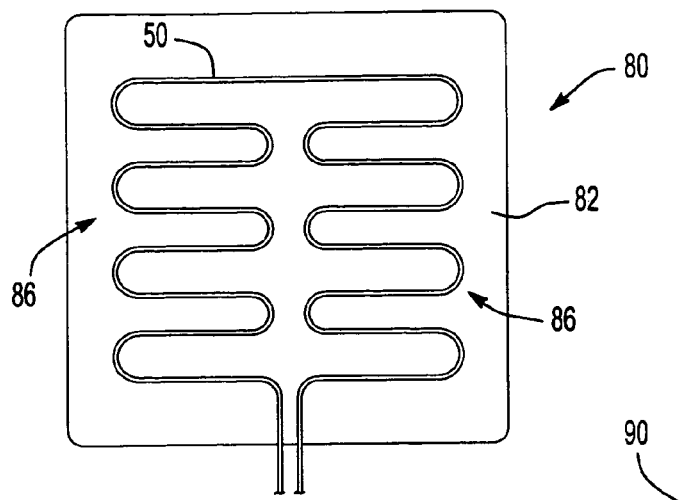
FIG. 3 is a top view of one illustrative heater element useful in accordance with the present invention.

Referring to FIG. 3, there is illustrated an exemplary heater 80 formed in accordance with an aspect of the present invention. For forming the heater 80, a substrate 82 is provided and a conductor it attached thereto. For exemplary purposes, the conductor 50 of FIG. 2 has been attached to the substrate 82 although, it shall be understood that any of the conductors discussed herein may also be used.

The substrate 82 is preferably a fabric material that is provided as a sheet or panel. Preferred fabric materials include fleece materials, felt materials, combinations thereof or the like. The conductor 50 is then arranged (e.g., patterned) upon the substrate 82 in a desired configuration. In FIG. 2, the conductor 50 is patterned in a serpentine manner and forms two undulating pathways 86 that are in a lateral or side-by-side relationship with each other. It shall be understood, however, that the conductor 50 may be patterned upon the substrate 82 in a myriad of configurations within the scope of the present invention.

For attaching the conductor 50 to the substrate 82, energy (e.g., heat) is preferably applied to the covering 58 of the conductor 50 for heating and at least partially softening (e.g., melting) at least the outer portion 64 of the covering 58 and preferably substantially only the outer portion 64 of the covering 58. Although, such energy may be applied according to different techniques, it is preferable for the particular example shown that such energy be applied by flowing an electrical current through the conductive element 52 for heating the element and the covering 58.

As the outer portion 64 of the covering 58 softens, the portion 64 preferably integrates itself with the substrate 82 such as by flowing into the substrate 82, wetting a portion or surface of the substrate 82, combinations thereof or the like. After integration of the outer portion 64 of the covering 58 with the substrate 82, the portion 64 of the covering 58 is preferably allowed to cool and harden (e.g., solidify) thereby attaching (e.g., adhering) the conductor 52 to the substrate 82 for forming the heater 80. If desired, a plate or other member may be employed to place pressure or force upon the substrate 82, the conductor 50 or both for urging the substrate 82 and conductor 50 into more intimate contact during integration of the covering 58 with the substrate 82.

Advantageously for the conductor of FIG. 2, the melting point of the inner portion 60 of the conductor 50 is typically higher than the melting point of the outer portion 64 of the conductor 50 such that the heating of the covering 58 only substantially softens the outer portion 64 of the conductor 50 without substantially softening the inner portion 60. This allows the outer portion 64 of the conductor 50 to attach to the substrate without risking substantial repositioning or other damage of the conductive element 52, the inner portion 60 or both.

It should be understood that while use of materials with pre-selected melting points is one preferred method of providing a covering that will attach itself to a substrate, it is also contemplated that other methods may be employed as well. In particular, it is contemplated that a covering may be configured to activate (e.g., soften) and integrate itself within a substrate by various methods. For example, a covering may be activated by exposure to a condition such as heat, pressure, moisture, heat or the like to chemically or otherwise physically activate or soften.

Vehicle Seat

With regard to heaters formed with the conductor of the present invention, it has been found that heaters such as the heater 80 of FIG. 3 are particularly suitable for integration to seats of automotive vehicles. Of course, conductors and heaters formed according to the present invention find utility in other articles of manufacture such as boats, furniture or the like as well.

A heater according to the present invention may be located in various portions of an automotive vehicle seat such as a support portion, a backrest portion, a shoulder support portion or a headrest. The heater may be located between the trim of the seat and the foam cushioning of the seat. The heater may also be integrated into the trim of the seat, the foam cushioning of the seat or both.

Figure 4:
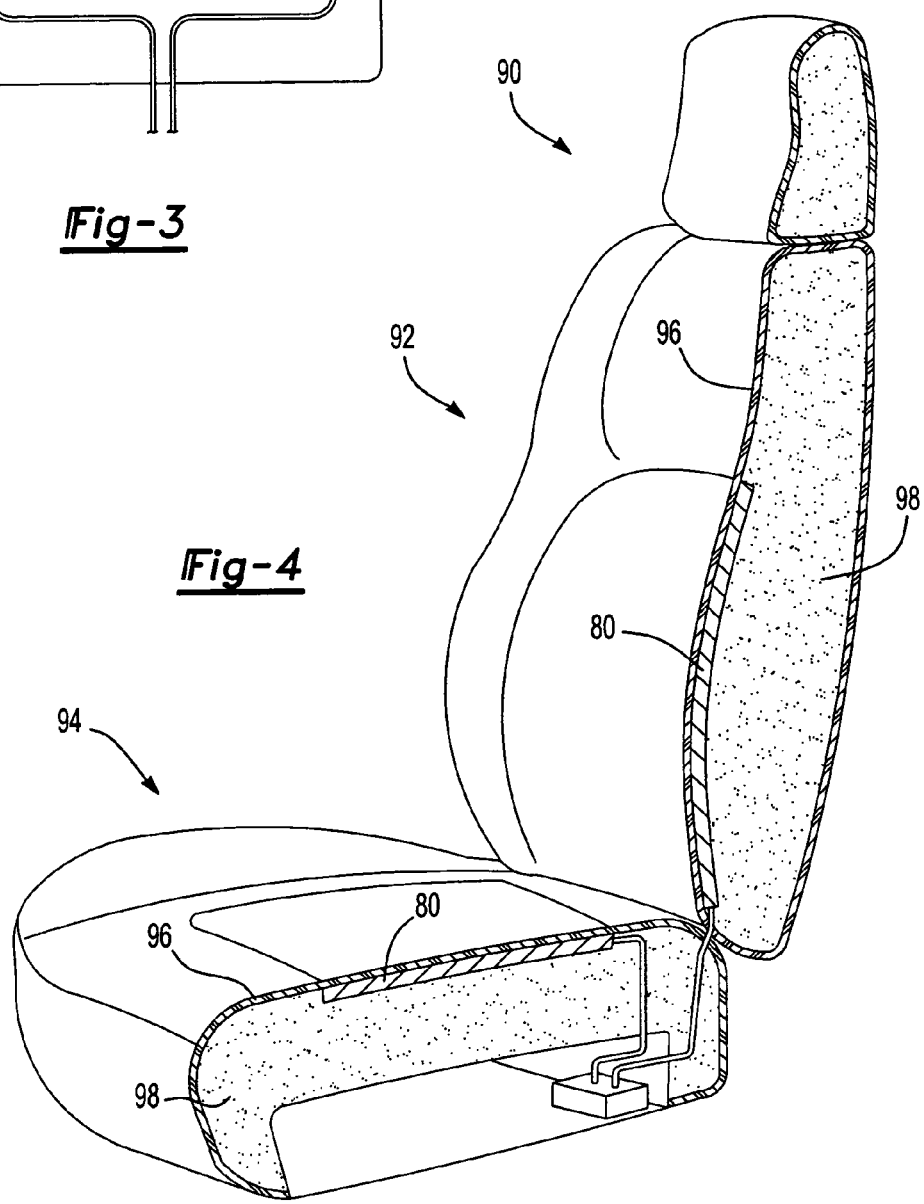
FIG. 4 is a partially cut away perspective view of a seat of an automotive vehicle seat assembly in accordance with an exemplary aspect of the present invention.

Referring to FIG. 4, a seat 90 of an automotive vehicle is illustrated wherein the heater 80 of FIG. 3 has been placed in both a seat backrest component 92 and a seat support component 94. In the embodiment illustrated, each component 92, 94 of the seat 90 includes a trim layer 96 and a foam cushion 98 and each of the heaters 70 is positioned substantially between the foam cushion 98 and trim layer 96. Preferably, each heater 70 is fastened to the seat 90 (e.g., the trim layer 96, the cushion 98 or both) for maintaining the heater 80 stationary relative to the seat 90.

In operation, a temperature regulation unit may be employed in conjunction with the heater 80. For example, a temperature regulation unit may include a controller and a thermostat configured for maintaining desired temperatures during heating.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. A heater comprising:
    a substrate substantially configured as a fabric, a panel, or a member; and
    a conductor patterned over at least one surface of the substrate, the conductor including:
        i) a conductive element; and
        ii) a covering substantially surrounding the conductive element, at least a portion of the covering being activatable upon exposure to heat;
    wherein the covering is integrated into the substrate for attaching the conductor to the substrate upon that application of heat and conductive element is capable of emitting an amount of heat sufficient to activate the covering.

2. The heater of claim 1 wherein the conductive element includes multiple metal strands.

3. The heater of claim 2 wherein the multiple metal strands at least partially surround an insert.

4. The heater of claim 1 wherein less than the entire length of the conductive element comprises the covering.

5. The heater of claim 1 wherein the covering is a polymeric material that coats the conductive element.

6. The heater of claim 1 wherein the substrate is formed of a flexible material.

7. The heater of claim 6 wherein the substrate is formed of a fabric material selected from the group consisting of fleece, gauze and felt.

8. The heater of claim 1 wherein the substrate is substantially configured as a polymeric panel.

9. The heater of claim 8 wherein the substrate is flexible.

10. The heater of claim 1 wherein the covering comprises a melting temperature gradient.

11. The heater of claim 10 wherein the gradient is from the conductive element to an outer surface of the covering.

* * * * *